United States Patent
Sumida et al.

[11] Patent Number: 5,847,871
[45] Date of Patent: Dec. 8, 1998

[54] MONOLITHIC MULTIFUNCTIONAL OPTICAL ELEMENTS

[75] Inventors: David S. Sumida, Los Angeles; Dennis C. Jones, Malibu, both of Calif.

[73] Assignee: Raytheon Company, El Segundo, Calif.

[21] Appl. No.: 223,190

[22] Filed: Apr. 5, 1994

[51] Int. Cl.$^6$ .................................................. G02B 5/30
[52] U.S. Cl. ........................... 359/487; 359/483; 372/100
[58] Field of Search .................................. 359/483, 488, 359/496, 500, 487; 372/100

[56] References Cited

U.S. PATENT DOCUMENTS

| | | | |
|---|---|---|---|
| 3,924,201 | 12/1975 | Crow ........................................... | 372/12 |
| 4,084,883 | 4/1978 | Eastman et al. ........................ | 350/152 |
| 4,525,034 | 6/1985 | Simmons ................................ | 359/488 |
| 4,740,986 | 4/1988 | Reeder ...................................... | 372/92 |
| 5,058,971 | 10/1991 | Schmitt et al. ............................ | 385/11 |
| 5,164,947 | 11/1992 | Lukas et al. ............................. | 372/22 |
| 5,218,610 | 6/1993 | Dixon ...................................... | 372/20 |
| 5,303,256 | 4/1994 | Sumida ................................... | 372/106 |

FOREIGN PATENT DOCUMENTS 1930612  3/1970  Germany .

OTHER PUBLICATIONS

Krutova et al, "Phototropic centers in chrominum–doped garnets", Optics and Spectroscopy, vol. 63, No. 5, Nov. 1987, pp. 693–395.

Patent Abstracts of Japan, unexamined applications, P field, vol. 16, No. 46, Feb. 5, 1992, The Patent Office Japanese Government, p. 70 P 1307; & JP–A–03 249 606.

Primary Examiner—Cassandra C. Spyrou
Assistant Examiner—Darren E. Schuberg
Attorney, Agent, or Firm—Colin M. Raufer; Leonard A. Alkov; Glenn H. Lenzen, Jr.

[57] ABSTRACT

Optical apparatus that combines a plurality of separate optical functions into a single monolithic optical element. The the optical element comprises two or three optical functions, such as saturable absorption, retroreflection, and polarization rotation. The optical element comprises a body that is formed in the shape of a right-angle porro prism. The optical element is fabricated from a garnet material that combines the properties of high refractive index (greater than 1.414 to permit total internal reflection at a 45 degree incidence angle), saturable optical absorption (to provide Q-switching), and tolerance to high temperatures (to permit application of anti-reflection coatings). The optical element may be comprised of garnet materials such as yttrium aluminum garnet, gadolinium scandium gallium garnet, or gadolinium scandium aluminum garnet, for example. Doping the garnet materials with tetravalent chromium ($Cr^{4+}$), for example, provides for saturable absorption while the natural properties of garnet materials provide high temperature tolerance.

5 Claims, 3 Drawing Sheets

MONOLITHIC MULTIFUNCTIONAL OPTICAL ELEMENTS

BACKGROUND OF THE INVENTION

1. Field of the Invention

The present invention relates generally to solid-state optical elements, and more particularly, to monolithic optical elements that combine a plurality of separate optical functions into single optical element to provide for multiple functions, and systems constructed using such monolithic optical elements.

2. Description of Related Art

Prior art systems in which the discrete optical functions of the present invention are performed by separate elements are well known. The disadvantages of these systems include their bulkiness, the difficulty of precise alignment of the elements, and the lack of ruggedness of their assembly and the high parts count, for example.

Publications and patent applications related to the present invention include L. I. Krutova et al., Opt. Spectrosc. (USSR), 63, 695 (1987); E. V. Zharikov et al, "Photochromic properties of a gadolinium-scandium-gallium garnet crystal," Preprint No. 238 USSR Academy of Sciences, Institute of General Physics, Moscow (1985); U.S. Pat. No. 5,303,256, for entitled "Quasi-Monolithic Saturable Optical Element," which is assigned to the assignee of the present invention.

Regarding the above-cited patent, it discloses an optical element wherein saturable absorption, polarization discrimination, and reflection are integrated into a quasi-monolithic solid-state optical element. The optical element comprises an undoped substrate having front and rear surfaces disposed at a predetermined angle. A dielectric coating is disposed on the rear surface of the substrate, and at least one saturable absorber platelet is disposed on the front surface of the substrate. Saturable absorbing species used in the platelet(s) are either $F_2^-$ color-centers in lithium fluoride or $Cr^{4+}$ dopant ions in one of several suitable host optical materials. Linear polarization discrimination of a laser beam is achieved by orienting the input face of the optical element at Brewster's angle. A dielectric coating (mirror) on the back surface of the optical element provides 100% reflectivity. This optical element provides passive Q-switching, discrimination for linear polarization, and laser beam reflection. By aligning the optical element for retroreflection, the Brewster's angle condition is automatically met and optimal polarization discrimination is achieved.

Accordingly, it is an objective of the present invention to provide for truly monolithic optical elements that combine a plurality of separate optical functions into a single optical element to provide for multiple functions, and systems constructed using such monolithic optical elements.

SUMMARY OF THE INVENTION

The present invention comprises an optical apparatus that combines a plurality of separate optical functions into a single optical element. Depending upon the embodiment, the present invention combines either two or three optical functions including saturable absorption, retroreflection in one plane, and polarization rotation, into a single miniature optical element. The optical element is fabricated from a material that combines the properties of high refractive index (greater than 1.414 to permit total internal reflection at a 45 degree incidence angle), saturable optical absorption (to provide Q-switching), and tolerance to high temperatures (to permit application of anti-reflection coatings). The single optical element is produced from garnet material which meets the refractive index requirement. Doping the garnets with tetravalent chromium ($Cr^{4+}$), for example, provides for saturable absorption in the near-infrared wavelength range while the natural properties of garnet provide high temperature tolerance.

More particularly, the present invention is a monolithic optical element comprising a body composed of a garnet material having a refractive index greater than 1.414 to provide for total internal reflection of incident light at angles of incidence of 45 degrees, and wherein the body is formed in the shape of a right-angle porro prism to provide for retroreflection in one plane and polarization rotation of the incident light rays depending upon the incident polarization orientation. The optical element may be composed of single-crystal host materials (garnet materials) such as yttrium aluminum garnet (YAG), yttrium scandium aluminum garnet (YSAG), yttrium scandium gallium garnet (YSGG), gadolinium scandium aluminum garnet (GSAG), gadolinium scandium gallium garnet (GSGG), gadolinium gallium garnet (GGG), gadolinium indium gallium garnet (GIGG), or suitable single crystal combinations of the above.

The present invention also provides for apparatus for providing polarization sensitive output coupling of light rays. The apparatus comprises an optical element as described above, a reflector, wherein the reflector and optical element are disposed to form a resonant cavity, a polarizer disposed in the resonant cavity, and a gain medium disposed in the resonant cavity. The apparatus may further comprise a ¼-wave retardation plate disposed in the resonant cavity. Rotation of the optical element about an optical axis of the apparatus provides a continuously variable outcoupling reflectivity of the light rays that enables tuning of the cavity for optimum efficiency.

The optical element of the present invention is simple to fabricate, easy to align, provides for integral rotation of polarization, may be made radiation hard, and reduces parts count in optical systems in which it is used. The present invention may be employed in Q-switched lasers, and the like. Commercial and industrial applications include, but are not limited to, semiconductor material processing such as resistor trimming and link blowing, for example.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DESCRIPTION OF THE PREFERRED EMBODIMENTS

Figure 1:
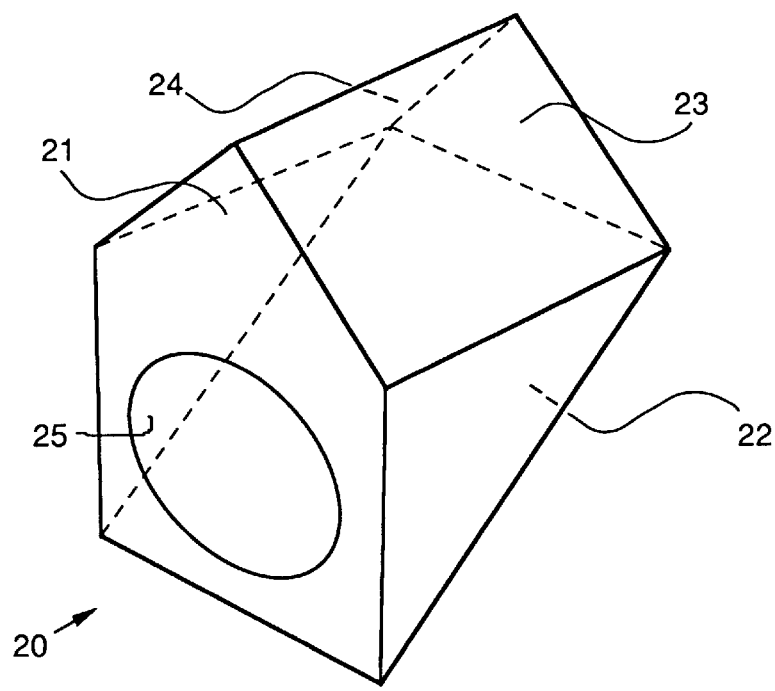
FIG. 1 shows a first embodiment of an optical element in accordance with the principles of the present invention.

Referring to the drawing figures, FIG. 1 shows a first embodiment of an optical element 20 in accordance with the principles of the present invention. The first embodiment of the optical element 20 comprises a body 21 made of garnet material, and the body 21 is formed in the shape of a right-angle porro prism 21. The optical element 20 may be comprised of the garnet materials identified in Table 1, and may include single-crystal host materials such as yttrium aluminum garnet (YAG), yttrium scandium aluminum garnet (YSAG), yttrium scandium gallium garnet (YSGG), gadolinium scandium aluminum garnet (GSAG), gadolinium scandium gallium garnet (GSGG), gadolinium gallium garnet (GGG), gadolinium indium gallium garnet (GIGG), or suitable single crystal combinations of the above. The porro prism 21 is composed of a solid piece of garnet material that has a front surface 25, a bottom internal surface 22, and two top internal surfaces 23, 24. The optical element 20, comprising the porro prism 21, provides for 100% reflectivity of incident light rays, which is a result of total internal reflection of light rays, provided by a laser, for example, entering through the front surface 25 and reflecting from the bottom and top internal surfaces 22, 23, 24 and exiting back through the front surface 25. The garnet body 21 also provides for rotation of the plane of polarization of the light rays provided by the laser. This polarization rotation is the result of the geometry of the body 21 of the porro prism 21 in which the light rays undergo total internal reflection first at the bottom surface 22 and then at the top internal surfaces 23, 24 of the porro prism 21 and finally again at the bottom surface 22.

Figure 2:
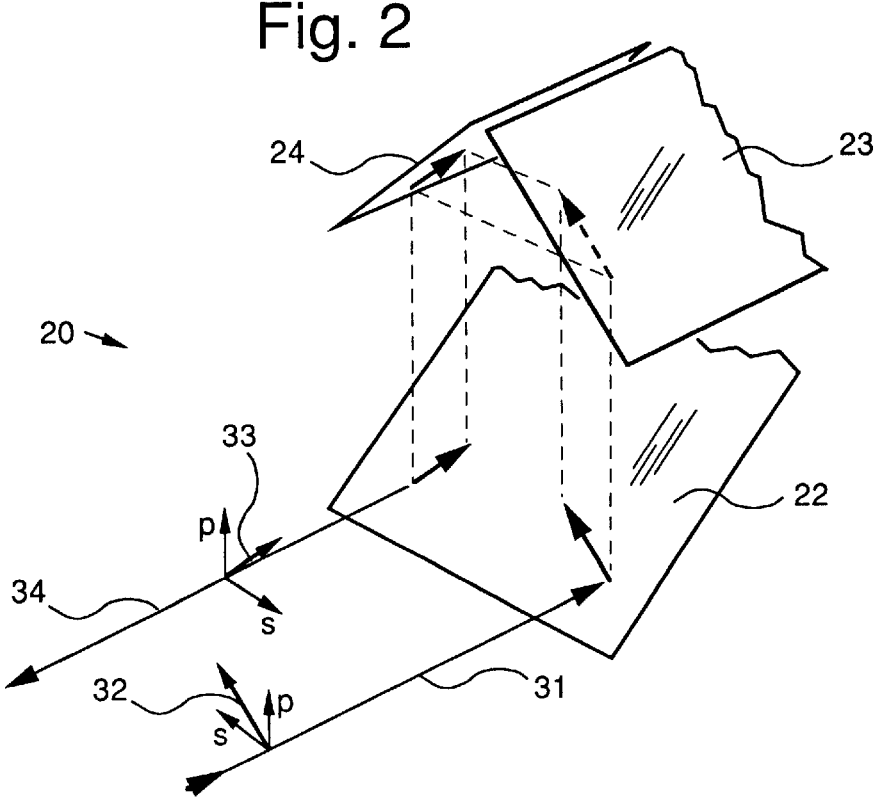
FIG. 2 shows the geometric rotation of the plane of polarization of light rays in the optical element shown in FIG. 1.

The geometric rotation of the plane of polarization of the light rays that occurs in the optical element 20 of FIG. 1 is shown in FIG. 2. The totally internally reflecting surfaces 22, 23, 24 are shown schematically with the bulk garnet material removed for illustration purposes only. An incoming light ray 31 is polarized at a 45 degree angle, shown by polarization vector 32. The combination of four internal reflections at the bottom surface 22, top internal surfaces 23, 24, and then the bottom surface 22, rotate the plane of polarization by 90 degrees as shown by polarization vector 33 on a retroreflected light ray 34. The geometric rotation occurs independent of whether the reflections are totally internally reflecting or not. Since the porro prism 21 is symmetric about the apex of top internal surfaces 23, 24, also known as the roof crest, the order in which the beam reaches the top internal surfaces 23, 24 does not matter. Indeed, usually the light rays (or beam) are centered upon the roof crest so that half of the beam reaches the top internal surface 23 at the same moment that the other half reaches the top internal surface 24. The polarization rotation is the same for both paths.

An alternative way of describing the 90 degree rotation of the plane of polarization of the light rays 31 by the optical element 20 is as follows. The polarization vector 32 may be decomposed into vectors p and s, where p is in the plane of incidence for the bottom internal surface 22 and s is orthogonal to that plane of incidence. After passage through the optical element 20, the orientation of the vertical p vector remains unchanged while the orientation of the orthogonal s vector has changed by 180 degrees. The angular rotation of the plane of polarization is twice its angle of incidence from the vertical. The polarization vector 32 which is incident at 45 counterclockwise degrees from the vertical emerges as polarization vector 33 which is 45 clockwise degrees from the vertical. The 45 degree polarization vector 32 has therefore undergone a 90 degree rotation to produce the polarization vector 33 when it emerges from the optical element 20 as retroreflected light ray 34.

Figure 3:
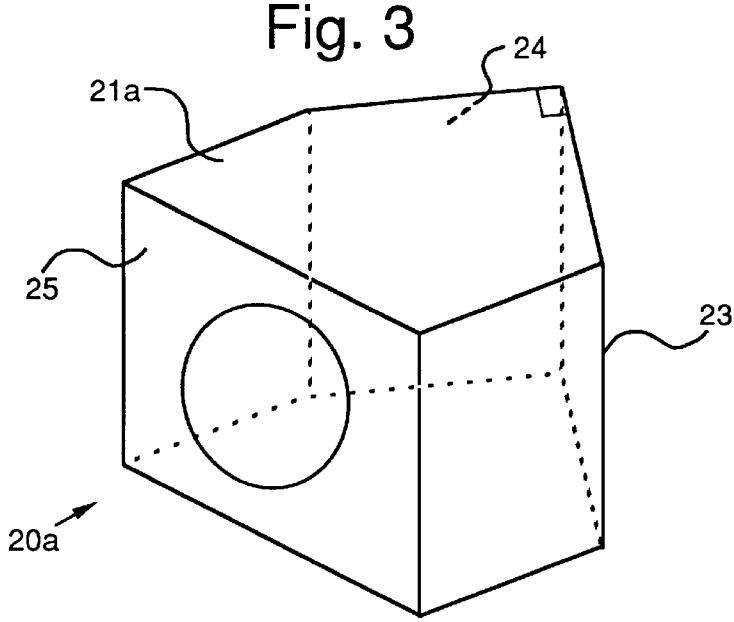
FIG. 3 shows a second embodiment of the present invention.

FIG. 3 shows a second embodiment of the optical element 20a of the present invention. The second embodiment of the optical element 20a is comprised of a garnet body 21a having a second configuration. The benefits of saturable absorption and retroreflection are combined into this second optical element 20a, which comprises a saturable absorbing or Q-switching porro prism 21a.

In a practical implementation of the first embodiment (comprising a polarization rotation upon reflection from porro prism 21), the optical element 20 may be employed in a polarization output coupling resonator, for example. The second embodiment of the optical element 20a (comprising a Q-switching porro prism 21a) is suitable for either a polarization output coupling resonator or an output-mirror cavity resonator. These cavity designs are discussed in detail below for the first and second embodiments of the optical element 20, respectively.

The present invention thus combines, depending upon the embodiment, a plurality of optical functions that include saturable absorption and radiation hardness, retroreflection, and polarization rotation, into a single optical element 20, 20a. The optical elements 20, 20a of the present invention are fabricated from garnet material, which combines the properties of high refractive index (greater than 1.414 to permit total internal reflection at a 45 degree incidence angle) and tolerance to high temperatures (to permit application of anti-reflection coatings). The refractive index of various garnet materials that may be employed in the optical elements 20, 20a are shown in Table 1. Doping the garnet material with tetravalent chromium ($Cr^{4+}$), for example, provides for saturable absorption (to provide Q-switching).

TABLE I

| Garnet material | Refractive index at $\lambda = 1\ \mu m$ |
|---|---|
| $Y_3Al_5O_{12}$ (Attrium Aluminum Garnet) | 1.82 |
| $Gd_3Sc_2Ga_3O_{12}$ (Gadolinium Scandium Gallium Garnet) | 1.94 |
| $Gd_3Sc_2Al_3O_{12}$ (Gadolinium Scandium Aluminum Garnet) | 1.88 |
| $Y_3Sc_2Al_3O_{12}$ (Yttrium Scandium Aluminum Garnet) | 1.86 |
| $Y_3Sc_2Ga_3O_{12}$ (Yttrium Scandium Gallium Garnet) | ~1.94 |
| $Gd_3Ga_5O_{12}$ (Gadolinium Gallium Garnet) | 1.94 |
| $Gd_3In_2Ga_3O_{12}$ (Gadolinium Indium Gallium Garnet) | 1.96 |

As Table I shows, all of these garnet materials have refractive indices that provide total internal reflection at a 45 degree angle of incidence of applied light rays.

Figure 4:
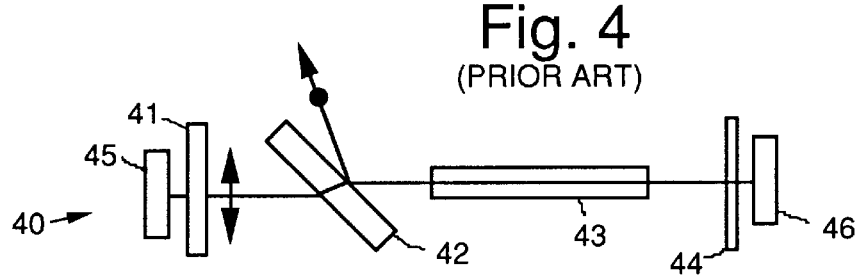
FIG. 4 shows a conventional prior-art Q-switching resonator.

In order to better understand the present invention, a brief description of a conventional prior-art Q-switching resonator 40 is provided for comparison, and with reference to FIG. 4. As shown in FIG. 4, this conventional resonator 40 is comprised of a saturable absorber Q-switch 41, a polarizer 42, an active laser element 43, ¼-wave retardation plate 44, and two mirrors 45, 46 (which may alternatively be replaced by glass porro prisms). Outcoupling of laser energy is controlled by rotating the ¼-wave retardation plate 44.

The key advantage of the first embodiment of the optical element 20 of the present invention is that it allows for replacement of several of the prior-art elements in this conventional resonator 40 while retaining its performance. The conventional elements that are replaced include one end mirror 46, the saturable absorber Q-switch 41, and the ¼-wave retardation plate 44 of the polarization output coupling resonator 40 shown in FIG. 4.

Figure 5:
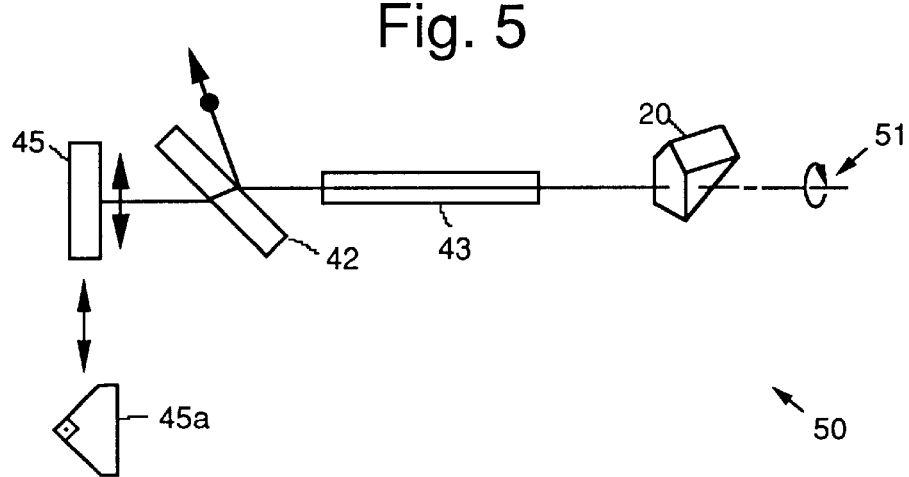
FIG. 5 shows a resonator made in accordance with the principles of the present invention.
Figure 6:
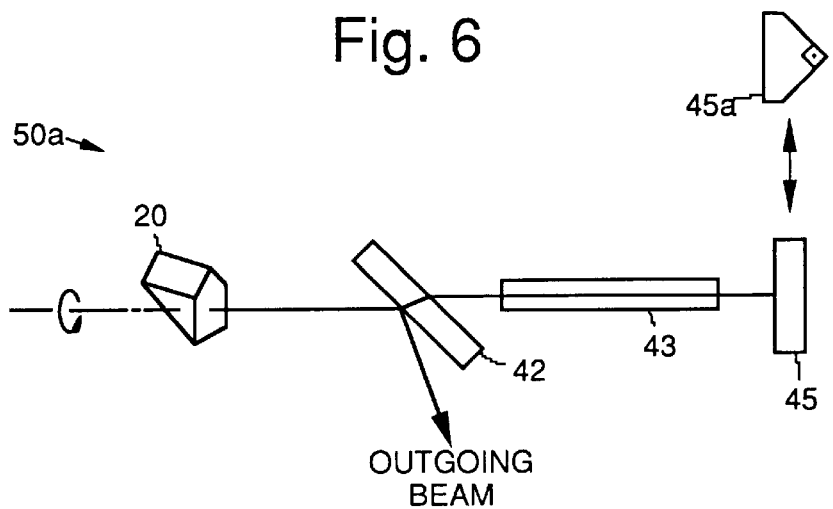
FIG. 6 shows an alternative resonator configuration in accordance with the principles of the present invention.

Accordingly, and with reference to FIGS. 5 and 6, polarization output coupling resonators 50 and 50a in accordance with the present invention are shown. The polarization output coupling resonator 50 is comprised of a reflector 45, such as the mirror 45 or a porro prism 45a, the polarizer 42, the laser rod or gain medium 43, and the optical element 20, such as has been described with reference to FIG. 1. Rotation 51 of the optical element 20 about a lasing axis provides a continuously variable outcoupling reflectivity that enables adjusting of the cavity for optimum efficiency in the presence of various cavity parameters. Hence, regardless of the level of birefringence effects or other losses, the optical element 20 may be easily optimized to provide for appropriate outcoupling of the laser energy. As shown in FIG. 5, the porro prism 45a, may be substituted for the end mirror 45, and provides the additional benefit of alignment insensitivity when its roof crest is orthogonal to the crest of the optical element 20. FIG. 6 shows an alternative configuration of the polarization output coupling resonator 50a in which the Q-switching function provided by the optical element 20 is located on the opposite side of the polarizer 42 from the gain medium 43.

Figure 7A:
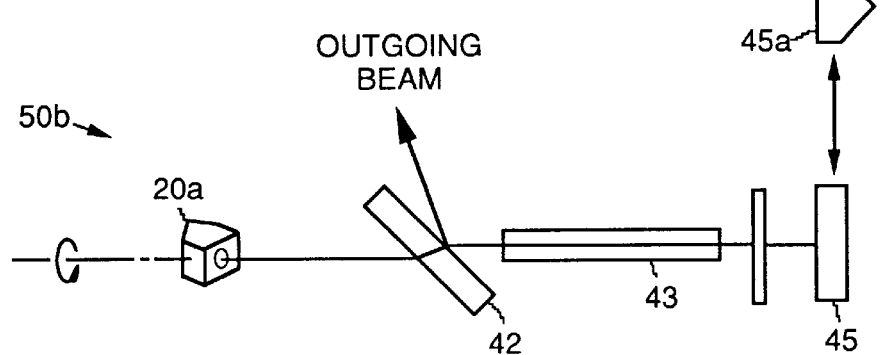
FIGS. 7a and 7b show various polarization output coupling resonators incorporating the second embodiment of the present invention.
Figure 7B:
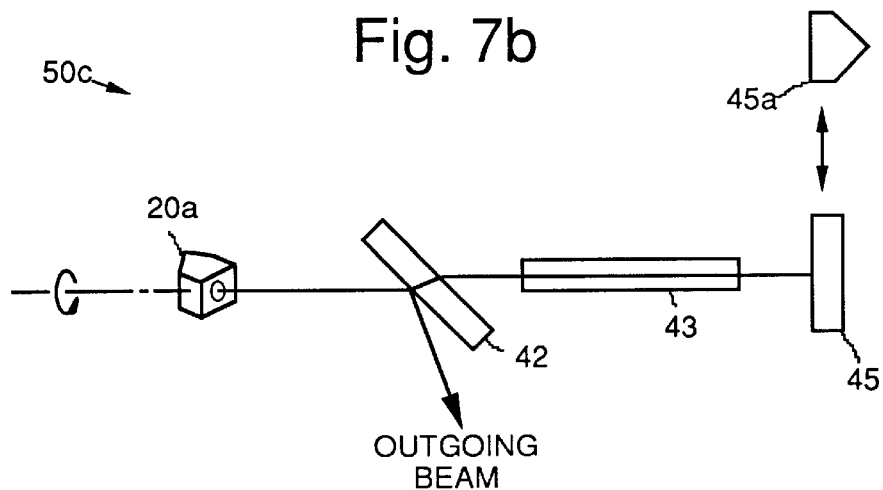

Other polarization output coupling resonators incorporating the second embodiment of the the optical element 20a shown and described with reference to FIG. 3 are shown in FIGS. 7a and 7b. In a similar fashion to the first embodiment of the optical element 20, the second embodiment of the optical element 20a replaces a combination of the prior-art elements. The polarization output coupling resonators 50b, 50c are comprised of the mirror 45, the ¼-wave retardation plate 44 (in 50b only), the polarizer 42, the laser rod or gain medium 43, and the optical element 20a, such as has been described with reference to FIG. 3. In the resonator 50b of FIG. 7a, outcoupling occurs as a result of rotation of the ¼ wave retardation plate 44, while in FIG. 7b (resonator 50c), the rotation of optical element 20a creates the outcoupling. In the case of the second embodiment of the optical element 20a, the outcoupling occurs as a result of polarization retardation due to phase shifts from the totally internally reflecting surfaces 23, 24 of the optical element 20a. The polarization retardation varies as a function of the orientation of the crest of the optical element 20a with respect to the surface of the polarizer 42. A second porro prism 45a, substituted for the end mirror 45 in FIG. 7, provides the same alignment insensitivity as mentioned earlier. Outcoupling is achieved by appropriate rotation of either the optical element 20a or the second porro prism 45a.

Thus there has been described new and improved monolithic optical elements that combine a plurality of separate optical functions into single optical element to provide for multiple functions, and systems constructed using same. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. An apparatus for providing polarization sensitive output coupling of light rays, said apparatus comprising:

an optical element that includes a body comprising a material having a refractive index greater than 1.414 to provide for total internal reflection of incident light, and wherein the body is formed in the shape of a right-angle porro prism to provide for retroreflection and polarization rotation of the incident light rays;

a reflector, and wherein the reflector and optical element are disposed so as to form a resonant cavity;

a polarizer disposed in the resonant cavity; and a gain medium disposed in the resonant cavity;

wherein rotation of the optical element about an optical axis provides a continuously variable outcoupling reflectivity of the light rays that enables tuning of the cavity for optimum efficiency.

2. The apparatus of claim 1 which further comprises a ¼-wave retardation plate disposed in the resonant cavity.

3. The apparatus of claim 1 wherein the reflector comprises a mirror.

4. The apparatus of claim 1 wherein the reflector comprises a porro prism.

5. The apparatus of claim 4 wherein the porro prism is composed of BK-7 material.

* * * * *